(12) United States Patent
Verhee

(10) Patent No.: US 8,465,185 B2
(45) Date of Patent: Jun. 18, 2013

(54) VEHICLE EXTERIOR LAMP

(75) Inventor: Patrick Verhee, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 261 days.

(21) Appl. No.: 12/984,783

(22) Filed: Jan. 5, 2011

(65) Prior Publication Data
US 2012/0170301 A1 Jul. 5, 2012

(51) Int. Cl.
*F21V 9/00* (2006.01)

(52) U.S. Cl.
USPC ........... 362/511; 362/487; 362/509; 362/551; 362/555

(58) Field of Classification Search
USPC ................. 362/487, 494–499, 509, 511, 551, 362/554, 555
See application file for complete search history.

(56) References Cited

U.S. PATENT DOCUMENTS
2007/0058383 A1* 3/2007 Gunther ........................ 362/494

* cited by examiner

*Primary Examiner* — Stephen F Husar
*Assistant Examiner* — Meghan Dunwiddie
(74) *Attorney, Agent, or Firm* — Brooks Kushman P.C.; Frank A. MacKenzie

(57) ABSTRACT

A vehicle lamp assembly is provided with a housing adapted to be mounted to a vehicle exterior. First and second light pipes are provided in the housing and each has a profile offset from one another. First and second light sources are provided in the housing for illuminating the first and second light pipes respectively. The first and second light pipes also have different depths.

15 Claims, 2 Drawing Sheets

VEHICLE EXTERIOR LAMP

TECHNICAL FIELD

Various embodiments relate to exterior lamps for automotive vehicles.

BACKGROUND

It is known in the art to provide passenger vehicles with a lighting system having various exterior lamps. The exterior lamps are lighting and signaling devices located on the front, sides, and rear of the vehicle. One purpose of the exterior lamps is to provide illumination for the driver to operate the vehicle safely. Another purpose of the lamps is to provide information regarding the vehicle presence and vehicle operating state to others.

Vehicles are often equipped with projector headlamp systems located on a front portion of the vehicle. Most projector headlamp systems in production combine a halogen or High Intensity Discharge (HID) source with a reflector, a lens, and a transparent cover that protects working parts and enhances appearance. Headlamps usually have a high beam function and a low beam function, as well as a daytime running operation. The vehicles also have tail lamps to provide lighting behind the vehicle and improve the visibility of the vehicle from behind.

Other exterior lamps are also commonly provided on a vehicle. Brakelamps are placed on the rear portion of the vehicle, which illuminate during a braking operation to inform others that the vehicle is slowing or stopping. Often the tail lamps and the brakelamps are combined into a rear combination lamp. Foglamps and parklamps are also often placed on a vehicle to provide lighting during poor visibility operations and while the vehicle is parked, respectively.

Turn signal lamps are provided on the front portion and rear portion of the vehicle and are used to signal a turning operation by the vehicle. The turn signal lamps may be incorporated into other existing exterior lamps, or be separate lamps on the vehicle.

Light emitting diodes (LEDs) are becoming more common as a light source in headlamps, rear combination lamps, and other exterior lamps in vehicles. LED headlamps consume less energy that halogen bulbs or HID lamps, and have a longer lifetime before replacement.

SUMMARY

At least one embodiment provides a light assembly comprising a housing adapter to be mounted to a vehicle exterior. First and second light pipes are provided in the housing and each have a profile offset from one another. First and second light sources are provided in the housing for illuminating the first and second light pipes respectively.

A further embodiment provides a controller in communication with the first and second light sources that is configured to illuminate the first and second light sources incrementally to generate an appearance of expanding or contracting illumination.

Another further embodiment provides the first light pipe with a perimeter. The second light pipe has a perimeter offset from the first light pipe perimeter.

A still further embodiment provides the second light pipe perimeter concentric with the first light pipe perimeter.

Another embodiment provides the first light pipe with a first outlet illumination surface that is generally perpendicular to a longitudinal direction of the vehicle.

A further embodiment provides the first light pipe with a second outlet illumination surface that is angled relative to the longitudinal direction of the vehicle.

A further embodiment provides the first outlet illumination surface of the first light pipe adjacent to the second outlet illumination surface of the first light pipe.

Another further embodiment provides the second light pipe with a first outlet illumination surface that is generally perpendicular to the longitudinal direction of the vehicle.

A further embodiment provides the second light pipe with a second outlet illumination surface that is angled relative to the longitudinal direction of the vehicle.

A further embodiment provides the first outlet illumination surface of the second light pipe adjacent to the second outlet illumination surface of the second light pipe.

A further embodiment provides the first light pipe with a depth, and the second light pipe with a depth that is different than that of the first light pipe.

A further embodiment comprises a controller in communication with the first and second light sources that is configured to illuminate the first and second light sources incrementally to generate an appearance of extending or retracting illumination.

Another embodiment comprises a third light pipe in the housing having a profile offset from the second light pipe, and a third light source in the housing for illuminating the third light pipe.

At least one embodiment provides a light assembly comprising a housing adapted to be mounted to a vehicle exterior. First and second light pipes are provided in the housing each having a different depth. First and second light sources are provided in the housing for illuminating the first and second light pipes respectively.

Another embodiment comprises a comprising a controller in communication with the first and second light sources and configured to illuminate the first and second light sources incrementally to generate an appearance of extending or retracting illumination.

Another embodiment provides a first light pipe with a perimeter, and the second light pipe with a perimeter that is offset from the first light pipe perimeter.

Another embodiment provides a second light pipe perimeter concentric with the first light pipe perimeter.

According to at least one embodiment, a light assembly comprises a first housing adapted to be mounted to a vehicle body exterior adjacent a vehicle body opening. A first light pipe is provided in the first housing having a profile with an open perimeter and a depth. A second light pipe is provided in the first housing having a profile offset from the first light pipe profile with an open perimeter and a depth different from that of the first light pipe. A first light source is provided in the first housing for illuminating the first light pipe. A second light source is provided in the first housing for illuminating the second light pipe. A second housing is adapted to be mounted to a vehicle closure exterior adjacent to the first housing. A third light pipe is provided in the second housing having a profile with an open perimeter for closing the perimeter of the first light pipe and a depth corresponding to that of the first light pipe. A fourth light pipe is provided in the housing having a profile offset from the third light pipe profile with an open perimeter for closing the perimeter of the second light pipe and a depth corresponding to that of the second light pipe. A third light source is provided in the housing for illuminating the third light pipe. A fourth light source is provided in the second housing for illuminating the fourth light pipe.

Another embodiment comprises a controller in communication with the first, second, third and fourth light sources that is configured to illuminate the first, second, third and fourth light sources incrementally to generate an appearance of expanding and extending illumination or contracting and retracting illumination.

Another further embodiment provides the second light pipe perimeter concentric with the first light perimeter, and the fourth light pipe perimeter is concentric with the third light pipe perimeter.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
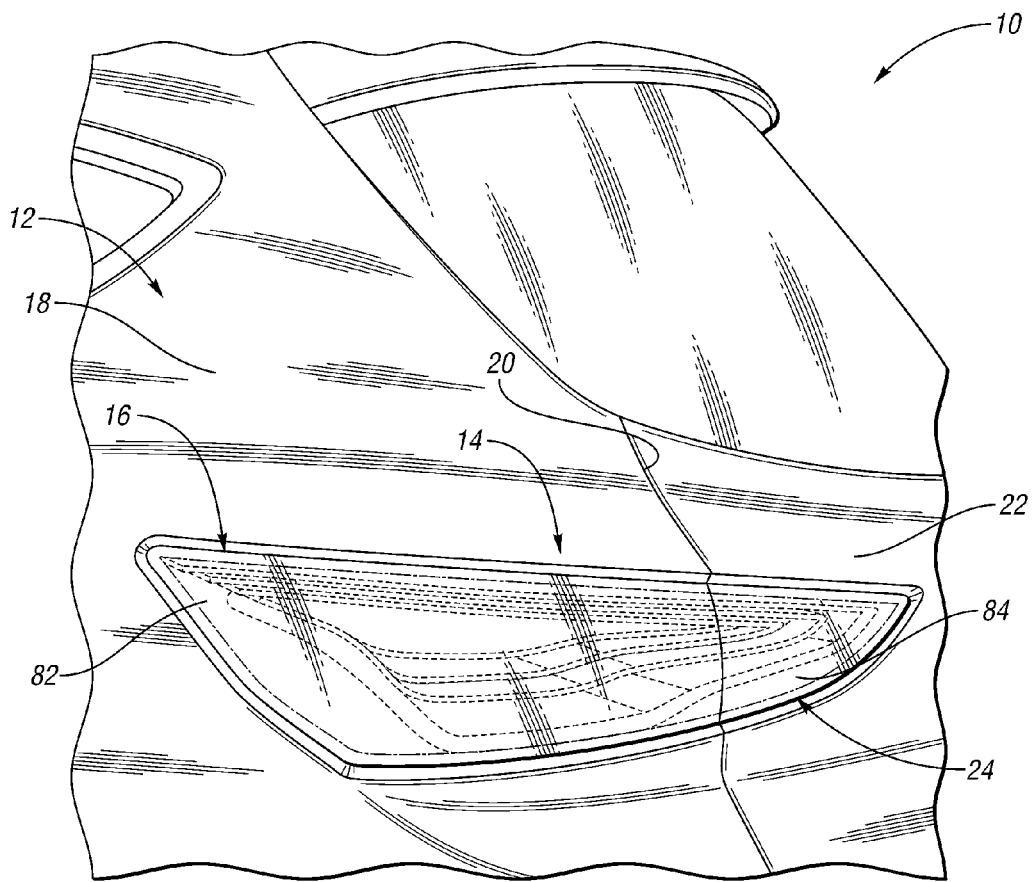
FIG. 1 is a rear perspective view of a vehicle with an exterior lamp according to an embodiment.
Figure 2:
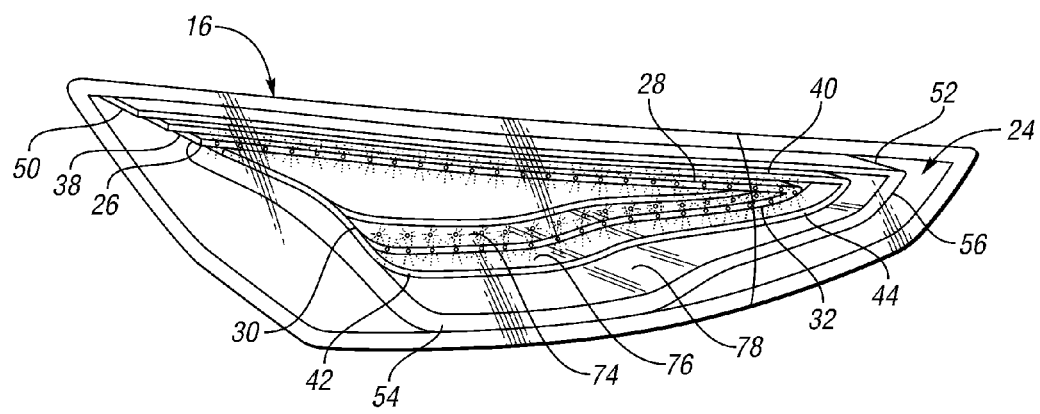
FIG. 2 is a schematic of the exterior lamp assembly of FIG. 1, illustrated in a first lighting operation.

FIG. 1 illustrates an automotive vehicle according to an embodiment, which is referenced generally by numeral 10. The vehicle 10 has a vehicle body 12 with an exterior lamp assembly 14 according to an embodiment. Although the lamp assembly 14 is depicted on a rear end of the vehicle body 12, the invention contemplates that the lamp assembly 14 may be provided anywhere on the vehicle body 12, such as at the front of the vehicle body 12. The lamp assembly 14 that is depicted is a tail lamp assembly and is provided with a primary housing 16 provided upon a rear quarter panel 18 adjacent a vehicle body opening 20. The vehicle body 12 includes a rear closure such as a lift gate 22 for closing the rear vehicle body opening 20. The tail lamp assembly 14 includes a secondary housing 24 that is provided upon liftgate 22. Although one taillamp assembly 14 is illustrated and described, the invention contemplates a pair of tail lamp assemblies 14, each provided with primary housings 16 on opposed rear quarter panels 18 adjacent opposed sides of the vehicle body opening 20. Likewise, the invention contemplates that the tail lamp assemblies 14 each include a secondary housing 24 each provided on opposed lateral side of liftgate 22 adjacent the corresponding primary housing 16 of the corresponding tail lamp assembly 14.

The tail lamp assembly 14 is utilized for signaling messages to other drivers as well as illumination for driving in reverse. Tail lamps have employed various lighting patterns in order to convey a message to other drivers. The tail lamp assembly 14 indicates a signal, such as turning by illuminating a pattern that increases in intensity, size and depth to generate the appearance of an object that is moving rearward and therefore, toward the viewer. The lighting pattern thereby is effective for getting the attention of other drivers like creating the appearance of a lighted object is moving toward other drivers.

Referring now to FIGS. 2-5, the tail lamp assembly 14 includes a plurality of light pipes and a plurality of light sources in order to generate the illumination effect. Each housing 16, 24 is provided with an upper central light pipe 26, 28 and a lower central light pipe 30, 32. Each upper central light pipe 26, 28 and lower central light pipe 30, 32 may be formed integrally to be illuminated at once, or may be formed separately depending upon design and manufacturing criteria. The light pipes 26, 28, 30, 32 can be formed from any suitable material, such as a translucent polymer.

Figure 5:
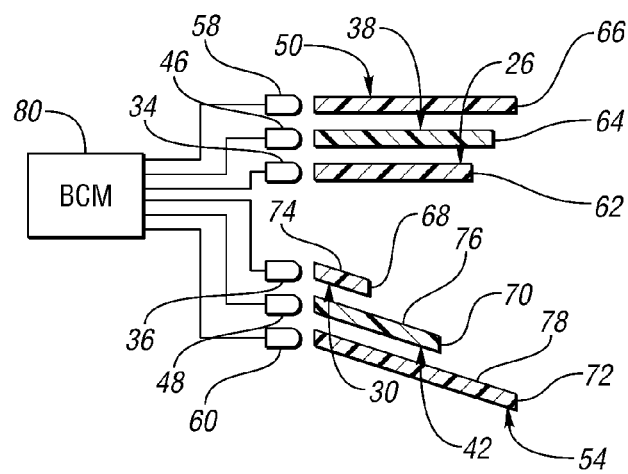
FIG. 5 is a schematic section of a light assembly of FIG. 1.

FIG. 5 is a section schematic view taken through the primary housing 16, thereby illustrating the primary upper light pipe 26 and the primary lower light pipe 30. Of course, a section schematic view taken through the secondary housing 24 would look similar. The primary central light pipes 26, 30 are illustrated with different hatch patterns to depict that the light pipes 26, 30 are formed separately. As discussed previously, the invention contemplates that light pipes 26, 30 may be formed integrally. One or more light sources, such as light emitting diode (LEDs) 34, 36 are provided behind the light pipes 26, 30 for illuminating the light pipes 26, 30.

Referring again to FIGS. 2-5, each of the housings 16, 24 include a plurality of light pipes that are offset from the central light pipes 26, 28, 30, 32. Accordingly, each of the housings 16, 24 includes an upper intermediate light pipe 38, 40 and a lower intermediate light pipe 42, 44. As illustrated in FIG. 5, LEDs 46, 48 are provided behind the primary upper intermediate light pipe 38 and the primary lower intermediate light pipe 42.

In FIGS. 2-5, the housings 16, 24 each include an upper outboard light pipe 50, 52 and a lower outboard light pipe 54, 56. FIG. 5 illustrates LEDs 58, 60 are provided behind the primary upper outboard light pipe 50 and the primary lower outboard light pipe 54.

Referring to FIGS. 2-5, the central light pipes 26, 28, 30, 32 are grouped together to be illuminated together. Likewise, the intermediate light pipes 38, 40, 42, 44 are grouped together to be illuminated together. The outboard light pipes 50, 52, 54, 56 are also grouped together to be illuminated together. Each light pipe grouping is offset from one another to generate an illumination effect that is either expanding or contracting. Each light pipe grouping also provides a perimeter, and the perimeters are generally concentric with one another.

As illustrated in FIG. 5, each of the upper light pipes 26, 28, 38, 40, 50, 52 has an outlet illumination surface 62, 64, 66. These illumination surfaces 62, 64, 66 are oriented generally perpendicular with a longitudinal direction of the vehicle 10 for direct illumination of a surface facing the driver. Likewise, each of the lower light pipes 30, 32, 42, 44, 54, 56 has a first outlet illumination surface 68, 70, 72 and is also generally perpendicular the longitudinal direction of the vehicle for facing an external viewer. In order to enhance the illumination effect, each of the lower light pipes 30, 32, 42, 44, 54, 56 has a second outlet illumination surface 74, 76, 78 respectively. Each of these lower light pipes 30, 32, 42, 44, 54, 56 is angled so that multiple illumination surfaces 62, 64, 66, 74, 76, 78 are exposed for providing directly facing, and indirectly facing illumination surfaces for enhancing the illumination effect. The second outlet illumination surfaces 74, 76, 78 are provided adjacent to the first outlet illumination surfaces 68, 70, 72 for providing a stepped look when viewed externally.

Each of the light pipes 26, 28, 38, 40, 50, 52 in the upper grouping and each of the light pipes 30, 32, 42, 44, 54, 56 in the lower grouping have varying depths so that as the light pipes 26, 28, 30, 32, 38, 40, 42, 44, 50, 52, 54, 56 are illuminated incrementally, an illumination effect is generated that is extending or retracting relative to the vehicle 10.

Figure 3:
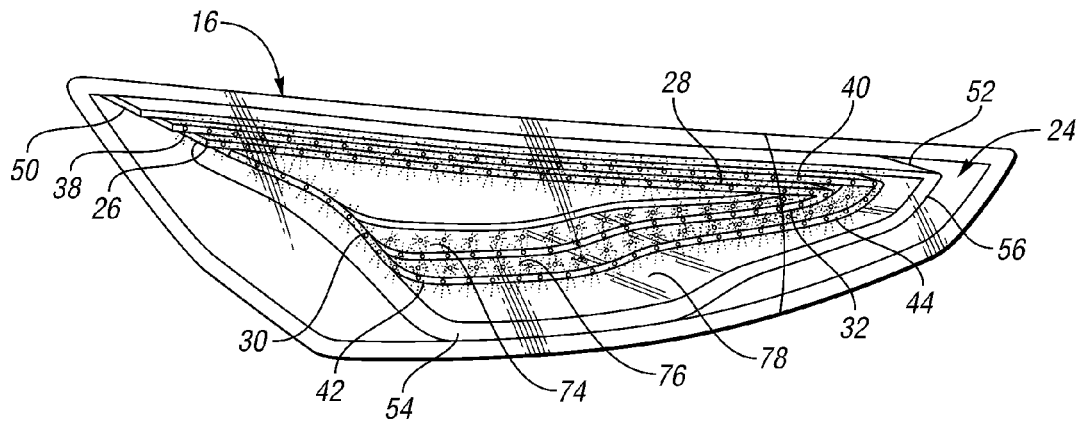
FIG. 3 is a another schematic view of the lamp assembly of FIG. 1, illustrated in a second lighting operation.
Figure 4:
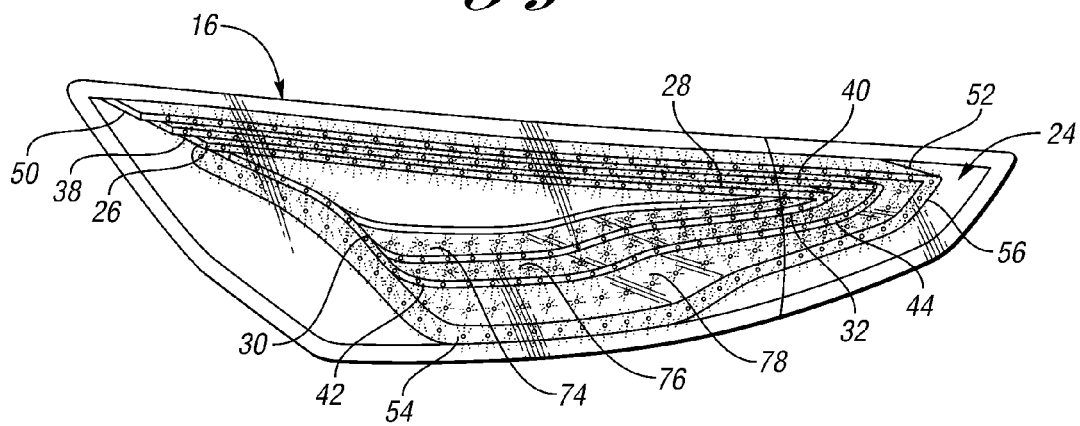
FIG. 4 is a schematic view of the lamp assembly of FIG. 1, illustrated in a third lighting operation.

A controller or body control module (BCM) 80 is in communication with each of the LEDs 34, 36, 46, 48, 58, 60 for providing an illumination effect that appears to extend while expanding through a sequence of illumination. The sequence of illumination begins at FIG. 2, wherein the central LEDs 34, 36 are operated thereby illuminating the central light pipes 26, 28, 30, 32. Referring to FIG. 3, the illumination effect is expanded and extended by incrementally illuminating the intermediate LEDs 46, 48 in combination with the central LEDs 34, 36 so that the intermediate light pipe grouping 38, 40, 42, 44 is also illuminated. Referring to FIG. 4, incrementally all LEDs are operated by adding operation to the outboard LEDs 58, 60 thereby adding illumination to the outboard light pipes 50, 52, 54, 56. By repeating this sequence, an illumination effect is generated that appears to expand and extend. According to another embodiment, an illumination effect that contracts and retracts is provided by reversing the sequence. Of course, various combinations and signal patterns are contemplated by the light pipe configurations and geometries disclosed herein in variations thereof.

The tail lamp assembly 14 also includes a pair of lenses 82, 84 each provided on one of the housings 14, 24 for enclosing each housing 14, 24.

Of course, other signal patterns can be provided by the tail lamp assembly 14. For example, a non-incremental illumination may be provided for indication of braking of the vehicle 10. Additionally, another light assembly may be provided, for example centrally within the light pipes, for rear illumination for driving in reverse.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lamp assembly comprising:
a housing adapted to be mounted to a vehicle exterior;
first and second light pipes in the housing each having a profile offset from one another; and
first and second light sources in the housing for illuminating the first and second light pipes respectively;
wherein the second light pipe has a perimeter offset from and concentric with a perimeter of the first light pipe.

2. The lamp assembly of claim 1 further comprising a controller in communication with the first and second light sources and configured to illuminate the first and second light sources incrementally to generate an appearance of expanding or contracting illumination.

3. The lamp assembly of claim 1 wherein the first light pipe has a first outlet illumination surface that is generally perpendicular to a longitudinal direction of the vehicle.

4. The lamp assembly of claim 3 wherein the first light pipe has a second outlet illumination surface that is angled relative to the longitudinal direction of the vehicle.

5. The lamp assembly of claim 4 wherein the first outlet illumination surface of the first light pipe is adjacent to the second outlet illumination surface of the first light pipe.

6. The lamp assembly of claim 3 wherein the second light pipe has a first outlet illumination surface that is generally perpendicular to the longitudinal direction of the vehicle.

7. The lamp assembly of claim 6 wherein the second light pipe has a second outlet illumination surface that is angled relative to the longitudinal direction of the vehicle.

8. The lamp assembly of claim 7 wherein the first outlet illumination surface of the second light pipe is adjacent to the second outlet illumination surface of the second light pipe.

9. The lamp assembly of claim 1 wherein the first light pipe has a depth; and
wherein the second light pipe has a depth different than that of the first light pipe.

10. The lamp assembly of claim 9 further comprising a controller in communication with the first and second light sources and configured to illuminate the first and second light sources incrementally to generate an appearance of extending or retracting illumination.

11. The lamp assembly of claim 1 further comprising:
a third light pipe in the housing having a profile offset from the second light pipe; and
a third light source in the housing for illuminating the third light pipe.

12. A lamp assembly comprising:
a first housing adapted to be mounted to a vehicle body exterior adjacent a vehicle body opening;
a first light pipe in the first housing having a profile with an open perimeter and a depth;
a second light pipe in the first housing having a profile offset from the first light pipe profile with an open perimeter and a depth different from that of the first light pipe;
a first light source in the first housing for illuminating the first light pipe;
a second light source in the first housing for illuminating the second light pipe;
a second housing adapted to be mounted to a vehicle closure exterior adjacent to the first housing;
a third light pipe in the second housing having a profile with an open perimeter for closing the perimeter of the first light pipe and a depth corresponding to that of the first light pipe;
a fourth light pipe in the second housing having a profile offset from the third light pipe profile with an open perimeter for closing the perimeter of the second light pipe and a depth corresponding to that of the second light pipe;
a third light source in the second housing for illuminating the third light pipe; and
a fourth light source in the second housing for illuminating the fourth light pipe.

13. The lamp assembly of claim 12 further comprising a controller in communication with the first, second, third and fourth light sources and configured to illuminate the first, second, third and fourth light sources incrementally to generate an appearance of expanding and extending illumination or contracting and retracting illumination.

14. The lamp assembly of claim 12 wherein the second light pipe perimeter is concentric with the first light pipe perimeter; and
wherein the fourth light pipe perimeter is concentric with the third light pipe perimeter.

15. A lamp assembly comprising:
a housing adapted to be mounted to a vehicle exterior;
first and second light pipes in the housing each having a profile offset from one another, the first light pipe having first and second outlet illumination surfaces generally perpendicular to, and angled relative to, a longitudinal vehicle direction, respectively; and first and second light sources in the housing for illuminating the first and second light pipes respectively.

* * * * *